June 3, 1969

E. O. WAGNER 3,447,831

EXPANDABLE CAMPER BODY

Filed Aug. 14, 1967

INVENTOR.
EMIL O. WAGNER
BY
Anderson, Spangler & Wymore

INVENTOR.
EMIL O. WAGNER

June 3, 1969     E. O. WAGNER     3,447,831
EXPANDABLE CAMPER BODY

Filed Aug. 14, 1967     Sheet 3 of 3

INVENTOR.
EMIL O. WAGNER

United States Patent Office 3,447,831
Patented June 3, 1969

3,447,831
EXPANDABLE CAMPER BODY
Emil O. Wagner, Lakewood, Colo.
(494 Carr St., Denver, Colo. 80226)
Filed Aug. 14, 1967, Ser. No. 660,339
Int. Cl. B60p *3/32;* E04b *7/16*
U.S. Cl. 296—27                            7 Claims

ABSTRACT OF THE DISCLOSURE

This invention relates to an expandable camper or trailer body of the telescoping type that incorporates a garage door type torsion spring, together with a system of pulleys, cables and guides as the lift mechanism.

---

Camper bodies mounted in the bed of a conventional pickup truck are rapidly replacing tents as temporary housing for campers and tourists. Trailers are also becoming more and more widely used by these same classes of travelers because they are so convenient and require very little set-up time. Even so, both the truck-mounted camper and vehicle-drawn trailer have their drawbacks, not the least of which is their excessive height to provide headroom for the occupants. This height, in the case of a camper renders the vehicle top-heavy and, therefore, unstable especially in high winds and when driving on curving mountain roads. As far as the trailers are concerned, their problem is not so much instability as it is visibility. The driver of the towing vehicle finds his backward vision blocked by the route of the rear view mirror so he must resort to large truck-type side view mirrors to see what is going on behind him.

Ample headroom is, of course, necessary if the occupants are to be able to move around without stooping over. On the other hand, when underway, the headroom is not needed and in most of these units very little utilization is made of space over, say, three or four feet above the floor for any other purpose than headroom. Such cabinetry as is used can either be placed at the ends or high enough up on the sidewalls to provide three feet or so between them and the bunks or other equipment.

The net result has been to design vertically telescoping camper and trailer bodies wherein the top half of the unit can be lowered in telescoping fashion down over the lower half while traveling and raised back up while parked. Obviously, such an arrangement provides greatly improved stability, considerably less wind resistance and near normal rear view vision for the driver.

While so-called "collapsible" or expandable" camper and trailer bodies are known in the prior art, the mechanisms employed to raise and lower the top half of the unit leave much to be desired. Most often, the mechanism employed for this purpose consists of some type of hand-operated crank that winds a system of cables or ropes on and off of a reel to raise and lower the unit. This is a time-consuming and difficult operation, especially if no counter-balance system is employed. About the only other way this operation is presently accomplished is through some system of jacks at the corners. Installations of the latter type are expensive and it is difficult to get all four corners to move together.

It has now been found in accordance with the teaching of the instant invention that these and other difficulties with the prior art expandable camper and trailer bodies can be eliminated by employing a heavy-duty torsion spring of the garage door lifting as the source of lifting power. Through an ingenious arrangement of cables and pulleys, all four corners can be lifted and lowered simultaneously by a single spring while leaving all of the utilitarian parts of the unit intact and readily available for use. In a camper body, the door is always at the rear of the unit, whereas, in a trailer, it is customarily in one of the sidewalls. To adapt the present lift system to either type unit, it is only necessary to locate the spring on the wall opposite the door, whether it be front or sidewall, so that the cables to the remote corners can pass along walls having no door therethrough.

It is, therefore, the principal object of the present invention to provide a novel and improved lifting mechanism for expandable camper and trailer bodies.

A second objective of the invention herein disclosed and claimed is the provision of a four-corner lift mechanism utilizing a single torsion spring as the power source.

Another object is to provide a telescopable body lift that is equally well-suited for use on truck-mounted campers and vehicle-drawn trailers.

Still another objective is the provision of an expandable camper or trailer lift that incorporates a novel system of cables and pulleys which do not interfere with either the location or use of any of the utilitarian equipment housed therein.

An additional objective is to provide a simple system of tracks and guides between the two telescoping halves of an expandable camper body that cooperate to both keep them aligned as well as from rubbing aginst one another.

A further object of the instant invention is to provide a body unit for campers and trailers that is inexpensive, compact, versatile, easy to operate, rugged, maintenance free and which requires no external source of energy.

Othe objects will be in part apparent and in part pointed out specifically hereinafter in connection with the description of the drawings that follows, and in which.

Figure 1:
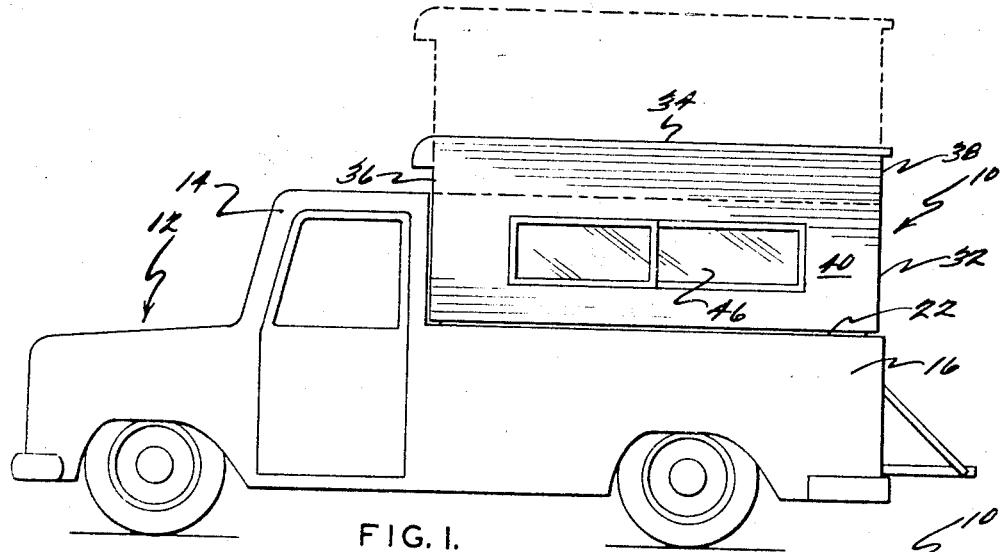
FIGURE 1 is a side elevational view showing the expandable body of the present invention mounted in place in the bed of a pickup truck with the top half telescoped down over the bottom half.
Figure 2:
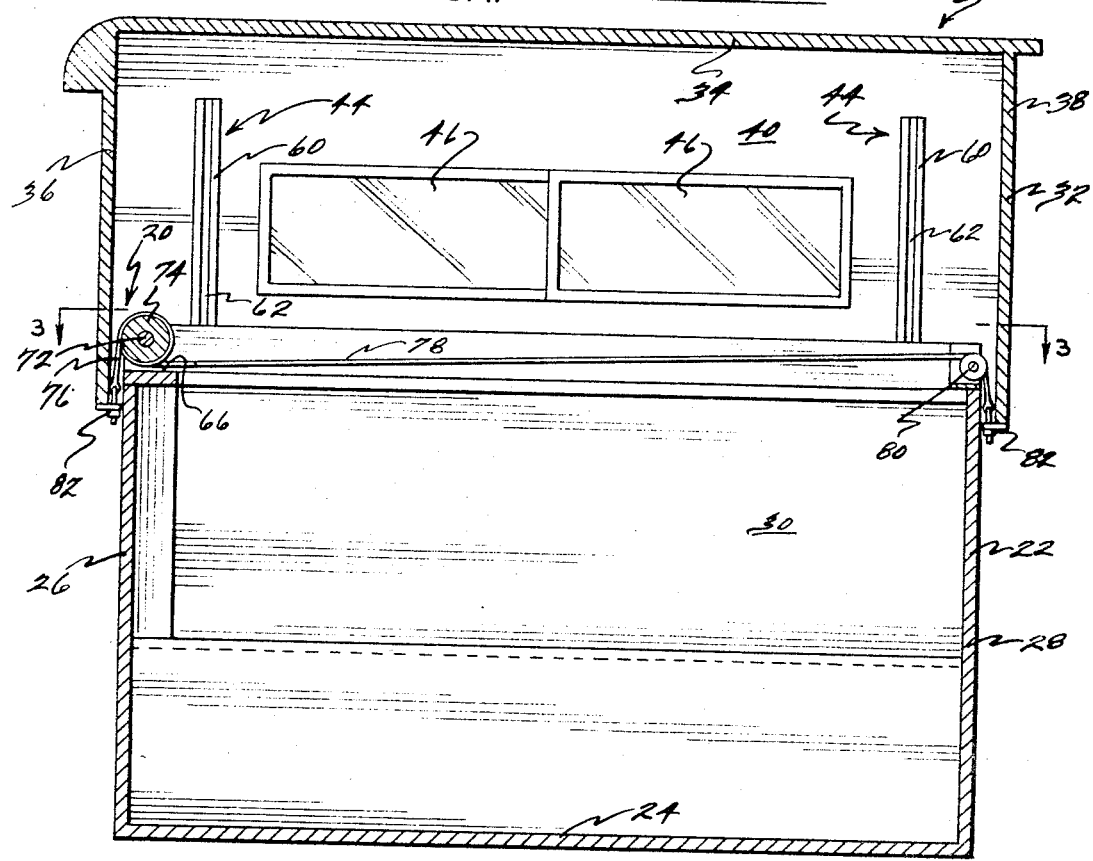
FIGURE 2 is a vertical section to an enlarged scale taken along line 2—2 of FIGURE 3 showing the unit expanded ready for use.
Figure 5:
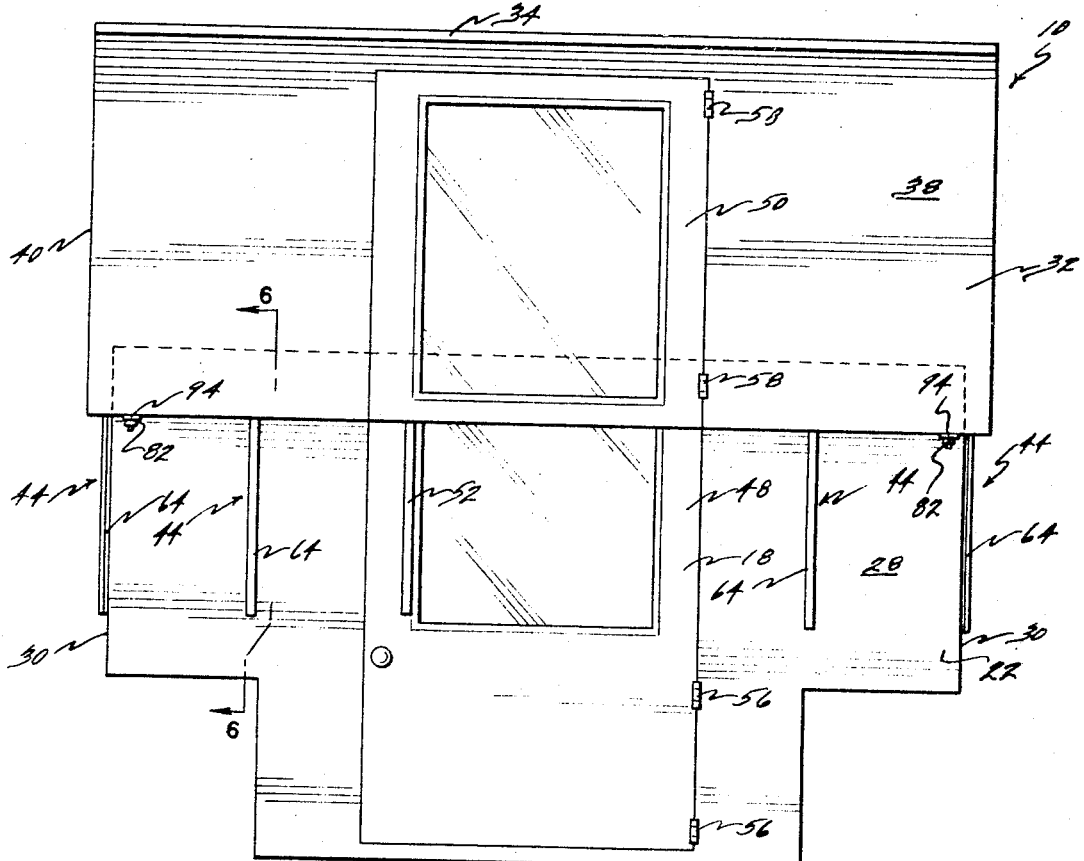
FIGURE 5 is a rear elevation of the camper body alone to a larger scale than FIGURE 1 showing it in expanded position ready for occupancy.

Referring now to the drawings for a detailed description of the instant invention and, initially, to FIGURES 1, 2 and 5 for this purpose, reference numeral 10 has been employed to designate the expandable body in a general way and reference numeral 12 to similarly denote the wheeled support therefor which, in the specific form shown, comprises an ordinary pickup truck having a cab 14 and a bed 16 within which the body rests. For purposes of illustration, the unit 10 has been shown in the form of a camper body; however, the invention is equally well-suited for use on an expandable trailer body wherein the wheels are attached directly thereto so that it may be drawn by a second self-propelled vehicle. While, as previously mentioned, trailers differ from campers in the shape of the living quarters and the location of the door 18, these differences are of no consequence insofar as utilization of the instant invention therein is concerned, the only requirement being that the torsion spring assembly, which has been broadly designated by reference numeral 20, be on the wall opposite the door. For this reason, the descriptive material which follows, along with the appended claims, are expressly intended to cover the telescoping body and elevating mechanism therefor without regard to the particular type of wheeled undercarriage upon which it is mounted.

The body 10 takes the form of an open-topped box 22 having a bottom 24, front and rear endwalls 26 and 28, and sidewalls 30, together with a telescoping lid portion 32 that has a top 34, front and rear endwalls 36 and 38, and sidewalls 40. In the case of a camper body, the bottom 24 of the box portion 22 rests in the bed 16 of the truck 12 and the sidewalls 30 are offset outwardly as shown in FIGURE 5 to provide an overhang that gives more room inside for the occupants. As is the case with the ordinary box and lid combination, the inside dimensions of the lid-forming portion 32 are slightly larger than the outside dimensions of the box portion so that the former can telescope down over the latter. In this particular instance, a space is left between the corresponding side and endwalls of the cooperating box and lid elements to leave room for the track subassemblies that have been indicated in a general way by reference numeral 44 and which will be described in detail in connection with FIGURE 6.

Figure 3:
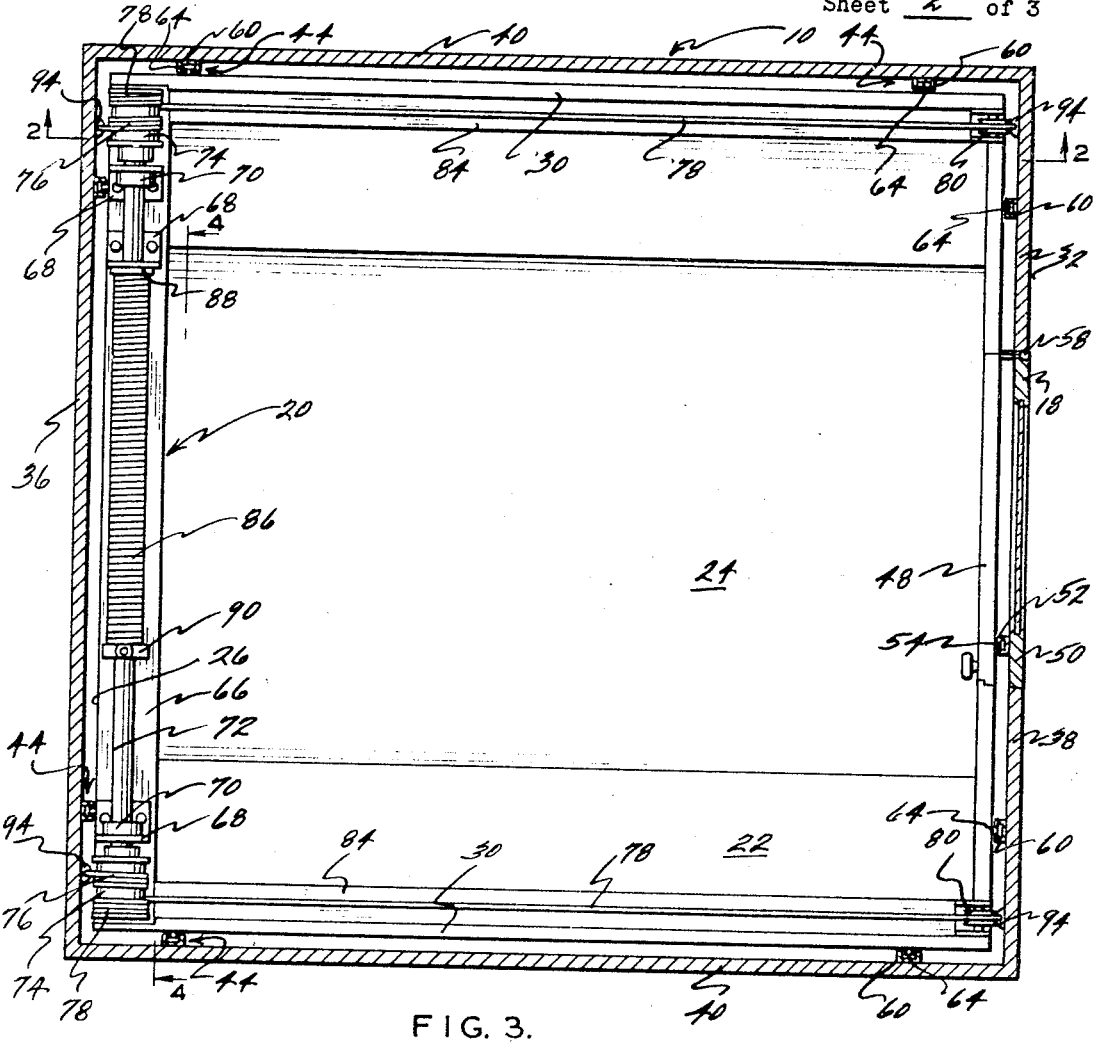
FIGURE 3 is a horizontal section taken along line 3—3 of FIGURE 2.
Figure 4:
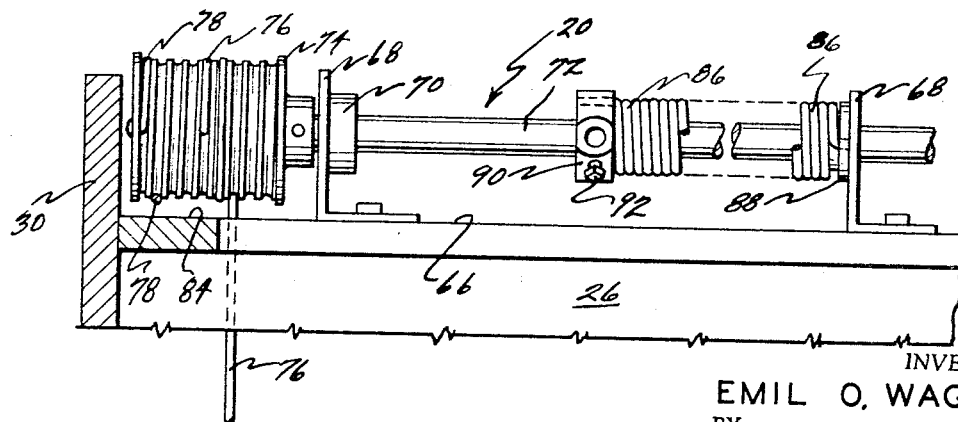
FIGURE 4 is a further enlarged fragmentary transverse section taken along line 4—4 of FIGURE 3.

As illustrated, the sidewalls 40 of the lid portion have windows 46, while the endwalls 28 and 38 of both sections carry approximately half of the door 18, the lower section of which carries reference numeral 48 while the upper section has been identified by reference numeral 50. The door sections 48 and 50 are hingedly mounted on their respective endwalls in the usual manner and, as seen in FIGURE 3, they are interconnected for relative vertical slidable movement by an interlocking vertical T-channeled track 52 fastened to the inside of section 50 remote from the hinges and a cooperating T-shaped runner 54 mounted on the outside of the lower section 48 for movement within said track. The leaves of hinge butts 56 on the lower section are oversized so that the hinge pins are in vertical alignment with those of butts 58 on the upper section. In the case of a trailer having the door in one of the sidewalls, the same type of door arrangement would be employed.

Figure 6:
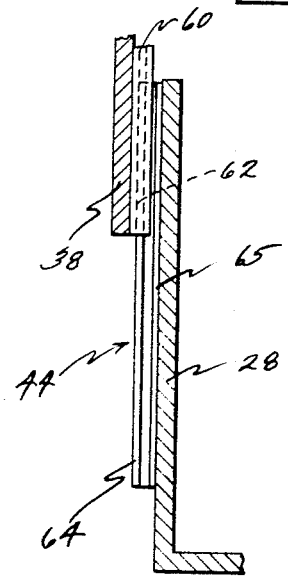
FIGURE 6 is an enlarged fragmentary section showing the guide rail subassembly taken along line 6—6 of FIGURE 5; and, FIGURE 7 is a top plan view greatly enlarged with portions broken away and shown in section revealing the construction of the cable and connector.

Before going into detail on the lift mechanism 20, it would, perhaps, be desirable to explain briefly the guide subassembly 44 that keeps the box and lid sections aligned during their telescoping movement, for which purpose, reference will be made to FIGURES 2, 3, 5 and 6, with particular emphasis on FIGURE 6. In the space between the sidewalls and endwalls of the two sections 22 and 32 adjacent each corner is positioned a guide subassembly 44, there being eight in all. In the particular form shown, subassembly 44 consists of a vertically-mounted, generally channel-shaped track member 60 having a T-shaped groove 62 running the entire length thereof, within which slides a T-shaped runner 64 that is mounted on the opposing wall surface. In FIGURE 6, runner 64 is shown provided with a mounting flange 65 which gives it an I-shaped cross section overall, with the T-shaped flanges forming an integral part thereof. While track 60 is shown mounted on the inside of the lid portion walls and the T-shaped runner 64 on the outside of the box portion walls, they may, obviously, be reversed. As illustrated, the guide subassembly 44 is of the same design as the elements 52 and 54 that interconnect the two sections of the door 18 together for slidable movement, although this needn't be the case. In fact, any number of commercially-available drawer guides, including those used on heavy metal file drawers, would function quite well for this purpose, and those illustrated are intended as being merely representative of the general type of guide that can be used.

Finally, with reference to FIGURES 2–5 and 7, the lift mechanism 20 of the present invention will be set forth in detail. A narrow horizontal shelf 66 is provided along the top edge of the box section 22 on the wall 26 thereof opposite the door 18. In this particular instance, wall 26 happens to be the front endwall; however, as previously mentioned, it could be one of the sidewalls 30 in case the doorway is in the other sidewall as is the case with most trailers. Fastened atop this shelf are a pair of L-shaped brackets 68, the upstanding flanges of which carry bearings 70 that journal shaft 72 for rotation. On opposite ends of this shaft are double-grooved cable reels 74 that are fastened thereto for conjoint rotation. These reels are referred to herein as "double reels" because each carries wound thereto two separate cables, one being the so-called "front" cable 76 that fastens to the lower edge of front wall 36 of lid section 32, and the other being the "rear" cable 78 that runs back along the top of the box section and over pulley 80 to its point of attachment with the lower edge of rear wall 38. Front cables 76 as illustrated have one end dead-ended on the reel between the ends thereof and the other similarly attached to the nearest corner of the lid section by means of cable connector 82 shown most clearly in FIGURE 7. Cables 76 are wound from their points of attachment on down to the end of the reel, leaving the other halves thereof free to receive rear cables 78. Both cables 76 and 78 are, of course, wound on their respective ends of the reels in the same direction because, as the reels rotate with shaft 72, they must cooperate to raise or lower all four corners of the lid section 32 simultaneously. As shown, the rear cables 78 run along atop a shelf 84 that is spaced slightly beneath the top edge of the sidewalls 30 and which hides them from view. The front cables, on the other hand, lie hidden between the front panels 26 and 36 of the box sections. Thus, by rotating shaft 72, the lid section 32 of the body can be raised up into its utilitarian position shown in FIGURE 5 or lowered for traveling as shown in FIGURE 1.

Rotation of shaft 72 in the direction required to raise the lid section is accomplished by heavy torsion spring 86 which is mounted on said shaft intermediate the reels 74. A third L-shaped bracket 68 is attached to shelf 66 and carries a connector 88 to which one end of the spring is dead-ended. Rotatable connector 90 fastens onto the other end of the spring and is rotated several turns upon shaft 72 in order to wind up said spring before being fastened to the shaft by means of set screw 92. The spring 86 is pre-loaded torsionally with the lid section all the way down a sufficient number of turns to nearly counterbalance the weight of said lid section. In this way, a modest amount of lift, such as might be exerted to open a garage door, is sufficient to raise the lid all the way to the top of its travel. Reversing this procedure easily lowers it for travel. Suitable latches (not shown) are provided on the body to lock it in both extended and retracted positions.

In FIGURES 3 and 5, it will be seen that the cable ends pass through eyelets 94 attached adjacent the lower corners of the lid section 32. No portion of the lift mechanism, including the cables, extends across the wall 38 that has the door therein. The windows 46 in the sidewalls of the lid section lie well above the cables when the unit is ready for occupancy.

Figure 7:
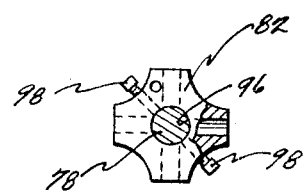

Lastly, FIGURE 7 shows the cable connector 82 which, in essence, is nothing more than a disk with a hole 96 in it sized to receive the cable and a couple of intersecting internally-threaded set screw openings adapted to receive set screws 98. Other types of connectors could, of course, also be used for this purpose; however, they should be adjustable along the cables so that the lid section can be set level with the box section.

Having thus described the several useful and novel features of the expandable camper body of the present invention, it will be apparent that the several worthwhile objectives for which it was developed have been achieved. Although but a single specific embodiment has been illus- trated, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. A vertically-expandable body for campers and trailers which comprises: an open-topped box-like lower section having a bottom, front and rear endwalls and sidewalls; a lid section having a top, front and rear endwalls and sidewalls sized to telescope down over the box section in the manner of a box lid, corresponding wall portions of said box and lid sections having an entryway therethrough; door-forming means hingedly attached to each of said box and lid sections in position to form a closure for said entryway; a shaft journaled for rotation about a horizontal axis atop the wall portion of the box section located opposite the entryway, said shaft extending from end-to-end thereof; a cable reel fastened to opposite ends of said shaft for conjoint rotation therewith; first cable means wound upon a portion of said reels having one end fastened thereto and the other end fastened to the adjacent bottom corner of the lid section; a pair of pulleys mounted for rotation about axes lying in spaced substantially parallel relation to said shaft axis atop the corners of said box section on the wall containing the entryway; second cable means wound upon a remaining portion of said reels in the same direction as the first cable means, said second cable means having one end attached to the reel and the other end attached to the adjacent unsupported lower corner of the lid section after being passed along the top edge of the adjoining box section wall and over the pulley at the corner formed thereby; and, means comprising a torsion-type coil spring mounted with the shaft passing therethrough and one end fastened to a non-rotatable abutment while the other end is secured to said shaft for rotation therewith after said spring has been pre-loaded torsionally in a direction to wind said first and second cables upon their respective reels so as to raise all four corners of the lid section simultaneously.

2. The vertically-expandable body as set forth in claim 1 in which: the interior wall surfaces of the lid section lie in spaced parallel relation to the exterior wall surfaces of the box section; and, in which vertically-disposed guide means are interposed between at least two of said spaced parallel wall surfaces located on opposite sides of the body, said guide means including a vertical channel-shaped track fastened to one of said opposed wall surfaces opening toward the other, and a slide means mounted on the other of said opposed wall surfaces in position to ride within said channel-shaped track as the lid section is raised and lowered relative to said box section.

3. The vertically-expandable body as set forth in claim 1 in which: both cable reels have helicoidal cable-receiving grooves on the surface thereof adapted to wind the cables thereon in parallel coils, one of said cables occupying one end of said reel and the other of said cables being wound upon the other end.

4. The vertically-expandable body as set forth in claim 1 in which: the door-forming means attached to the lid and box sections have their opposed surfaces lying in spaced parallel relation to one another; and, in which means comprising a telescopable connector is disposed in vertical position between the door-forming means adjacent the edge thereof remote from the hinged connection, said connector including a channel-shaped track and a slidable element mounted for vertical slidable movement within said track, said track and slidable element cooperating to permit relative vertical movement between the sections of said door-forming means while interconnecting same for conjoint pivotal movement about their hinged connection.

5. The vertically-expandable body as set forth in claim 1 in which: the entryway is located in the rear endwalls of the box and lid sections, the shaft is journaled in the front endwall of the box section, and the pulleys are located at the upper corners of the rear endwall of the box section.

6. The vertically-expandable body as set forth in claim 2 in which: two guide means are located in the space between each corresponding panel of the box and lid sections, one such guide means adjacent each corner thereof.

7. The vertically-expandable body as set forth in claim 2 in which: the track means has a T-shaped groove extending the length thereof and the slide means includes a T-shaped runner positioned and adapted for telescopic slidable movement within said T-shaped groove.

References Cited

UNITED STATES PATENTS

| | | | |
|---|---|---|---|
| 3,339,321 | 9/1967 | Schmidt | 296—27 |
| 3,048,438 | 8/1962 | Koch | 296—23 |

PHILIP GOODMAN, *Primary Examiner.*

U.S. Cl. X.R.

52—66